(12) United States Patent
Schmidl

(10) Patent No.: US 7,883,885 B2
(45) Date of Patent: Feb. 8, 2011

(54) SLIDE COMPOSTER

(76) Inventor: Reinhard Schmidl, Rechbauer-strasse 23, Graz (AT) A-8010

( * ) Notice: Subject to any disclaimer, the term of this patent is extended or adjusted under 35 U.S.C. 154(b) by 447 days.

(21) Appl. No.: 12/067,998

(22) PCT Filed: Oct. 4, 2006

(86) PCT No.: PCT/AT2006/000401

§ 371 (c)(1),
(2), (4) Date: Mar. 25, 2008

(87) PCT Pub. No.: WO2007/038813

PCT Pub. Date: Apr. 12, 2007

(65) Prior Publication Data

US 2008/0254534 A1    Oct. 16, 2008

(30) Foreign Application Priority Data

Oct. 6, 2005 (AT) ............................... A 236/2006
Oct. 6, 2005 (AT) ............................. GM 676/2005

(51) Int. Cl.
*C12M 1/00* (2006.01)
*C05F 11/00* (2006.01)

(52) U.S. Cl. ..................... 435/290.1; 71/11; 71/23; 435/291.3; 435/291.4

(58) Field of Classification Search ............. 435/290.1, 435/291.3, 291.4; 71/11, 23
See application file for complete search history.

(56) References Cited

U.S. PATENT DOCUMENTS 4,105,412 A * 8/1978 Petzinger ................... 422/275
4,984,561 A * 1/1991 Warrington ............... 435/290.1
5,258,306 A * 11/1993 Goldfarb .................. 435/290.2
5,339,974 A * 8/1994 Raghunathan ............. 220/4.26
5,994,122 A * 11/1999 Cooper et al. ............ 435/290.1

FOREIGN PATENT DOCUMENTS

| DE | 2723581 A1 | 9/1978 |
| DE | 3743651 A1 | 7/1989 |
| FR | 783400 A | 7/1935 |
| GB | 2327415 A | 1/1999 |

* cited by examiner

*Primary Examiner*—Christina Johnson
*Assistant Examiner*—Robert Warden
(74) *Attorney, Agent, or Firm*—David A. Guerra

(57) ABSTRACT

The invention relates to a device for the composting of biogenic materials, wherein material introduced at the top of a container as in FIG. 2*b* reaches a storage chamber (2) arranged below a reactor chamber (1) passing therethrough only by gravity with air introduction. Slide surfaces are provided which brake the downward material flow. Slide vanes (4), for example, can be used as slide surfaces and also other slide devices such as tubes, funnels, spheres and particular container shapes. The compost can be easily removed from the storage container by means of a shovel, or similar without the weight of the heap affecting the shovel. The otherwise necessary shifting of the heap in order to reach the mature compost on the floor is thus avoided. The heap is also vertically aerated over the whole surface thereof from bottom towards the top, the composting organisms are continually optimally supplied with air and optimal conversion rates of fresh biowaste to compost achieved.

20 Claims, 1 Drawing Sheet

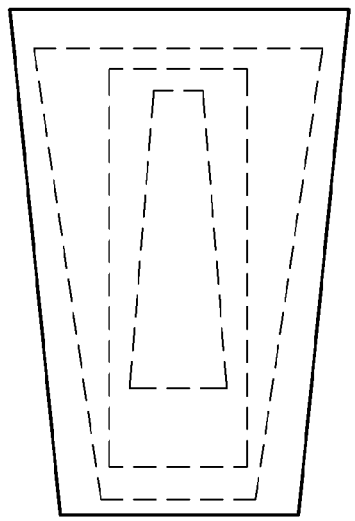
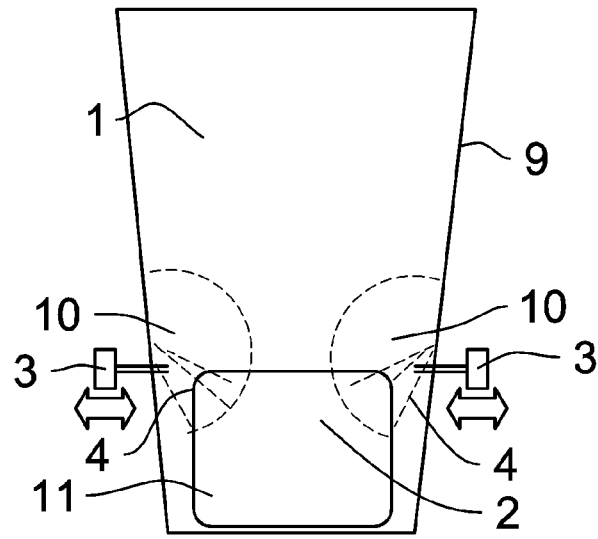
FIG. 1a  FIG. 2a
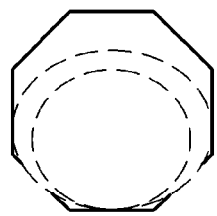
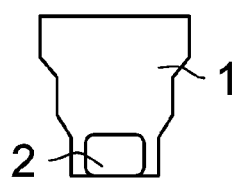
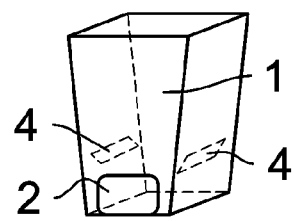
FIG. 1b  FIG. 1c  FIG. 2b
FIG. 3
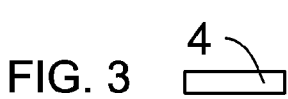
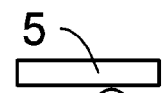
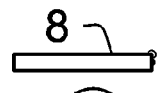
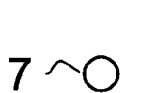
FIG. 3a  FIG. 3b  FIG. 3c  FIG. 3d  FIG. 3e
FIG. 4
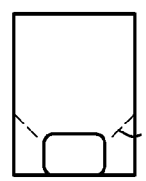
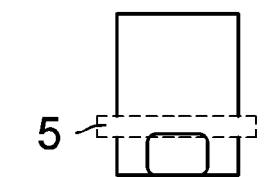
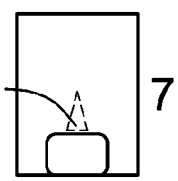
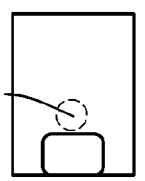
FIG. 4a  FIG. 4b  FIG. 4c  FIG. 4d
FIG. 5
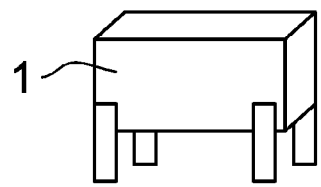
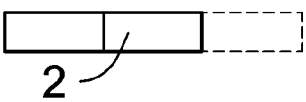

SLIDE COMPOSTER

CROSS-REFERENCE TO RELATED APPLICATIONS

This application is an U.S. national phase application under 35 U.S.C. §371 based upon co-pending International Application No. PCT/AT2006/000401 filed on Oct. 4, 2006. Additionally, this U.S. national phase application claims the benefit of priority of co-pending International Application No. PCT/AT2006/000401 filed on Oct. 4, 2006, Austria Application No. A 236/2006 filed Oct. 6, 2005, and Austria Application No. GM 676/2005 filed on Oct. 6, 2005. The entire disclosures of the prior applications are incorporated herein by reference. The international application was published on Apr. 12, 2007 under Publication No. WO 2007/038813.

FEDERALLY SPONSORED RESEARCH

Not applicable

SEQUENCE LISTING OR PROGRAM

Not applicable

BACKGROUND OF THE INVENTION

1. Field of the Invention

The invention concerns a composting device which produces high-quality compost without the necessity to turn over the organic material.

2. Description of the Prior Art

Organic material for composting is usually stacked in piles on the ground. Compost ready for harvesting is always found right at the bottom of pile, making it necessary to use a gardening tool such as a fork or shovel to get to the matured organic material under the heap. This entails much physical effort especially as the compost usually weighs at least 100 kilograms. One must first remove the unripe material from the pile and place it aside the heap so that the mature compost can be removed.

In many composting instruction manuals from the manufacturers of conventional compost equipment, the harvesting of part or all of the ready-to-use compost is described as easy. For instance, the company Otto Graf Gmbh, in Tennington, Germany stated in their brochure that "the removal of compost is very simple: small amounts are taken out through the side slide-openings. When one needs to remove larger amounts, it is more comfortable to follow the following procedure: take off the entire cylinder—put the upper layer with the active micro-organisms to one side—clear away the finished compost from the floor-plate—clean the grooves for the cylinder in the floor-plate. Put the cylinder back on and refill it from above with the unready compost". This quote from Otto Graf GmbH serves as an example for many other compost makers such as Alko company, whose web-site can be seen on http://www.alko.de/garten-hobby/gartenforum/haeko/umsetzen.html.

Heaps stored on the floor are only ventilated at the sides, which has two further disadvantages. Firstly, micro-organisms living in the inner part of the compost heap suffer from a constant lack of air. This is only alleviated by periodically turning the pile over. After only a day, if pile is not turned over the air deficit reoccurs. Secondly, in the centre of the heap, putrefaction zones develop causing very bad odours. Furthermore the micro-organisms can only work poorly due to the lack of air, and much more slowly than when there is a sufficient supply of air. In trials it has been shown that optimal ventilation of compost heaps increases composting performance by three to four times.

Compost heaps placed on the ground, have long been used for making one's own compost. The usual composter available on the market using the above-described method of composting is essentially nothing other than containers of compost heaps. It is often made of plastic, wood, or metal, can be round, square or pyramid shaped and mostly has a lid at the top for filling and a door at the bottom for removing the mature compost. It is however often more difficult to use than an initial inspection may indicate for physical reasons.

Some devices such as W00140140 have ventilation nozzles in the middle to improve aeration at the core of the heap and/or a 1-4 cm high floor perforated with small holes (Graf Schnellkomposter). The ventilation nozzles and the perforated floor improve the air supply only so long as the holes and the lower double floor underneath are blocked with fine ripe compost because the desired total vertical aeration of the heap away from the floor cannot be achieved. In both cases further turning over of the heap cannot be avoided and is necessary.

Many attempts have been made to reduce the physical effort involved in turning compost over using mechanically operated scraping, jogging, scratching components and the like over a grille. What all these devices have in common is that the material can only be obtained through the grille using moving parts (DE-A1 27 37 421, AT-A 320 688, AT-A 346 375 among others). The problem in this case is that the expense involved for an ordinary household is too great.

On the other hand SE 520325 is simpler, where a grille on which the compost lies, is moved manually. EP 1118604 and NZ248540 use divider panels which are pulled in and out by hand and require once again physical effort from the user, as is also the case for DE 4314786 which has divider bars which must be pulled out.

Compost in the compost drum used in EP 1348682 is well aerated and mixed through rotation of the drum by moving an external axle. This technology however is considerably more expensive than conventional home composting devices and also involves physical exertion from the user.

The Rototherm compost maker from the Juwel company in Imst, Austria is described as follows on its home page on http://www.juwel.com/k_e1_frame.html: "Turning compost over is no longer necessary! Through easy-to-use intelligent technology low-smelling compost can be obtained very quickly. Both the laborious and not always hygienic turning over and sieving for fine particles required when using conventional compost makers is completely unnecessary." The turning over is achieved by moving a spirally-shaped stirrer over a perforated plate. Whether this mincing principle, where the screw lies close up to the cylinder wall functions, the container being 100 cm in diameter is still debatable. In any case physical effort is still required to operate the apparatus, and moreover, the cost is far too high for the purposes of home composting and is about four times more expensive than a conventional composter.

In order to work, Patent EP 0485 358 B1 requires dry and crumbly mature compost rather than "sticky" raw compost which would lead to formation of bridges or arches on the grille causing residual material to remain in the decomposition chamber (column 2 lines 39-58).

It was attempted to shorten the time necessary to attain a crumbly composition by adding compost worms to the compost to solve the problem of bridge formation on the grille in order to speed up the process. However, despite intensive experiments carried out using a 50 m$^3$ experimental container, the requisite dry and crumbly state in accordance with EP 0485 358 B1 could not be reached within a reasonable time. The compost crumbled on the grille only at the beginning, until arch-like bulges and bridges formed on the grille, after which the pile came to a standstill and the ready but still sticky compost could not without assistance reach the storage chamber.

Over time, compost mineralises and becomes more crumbly. This however requires much more time using EP 0485 358-B1 even with the addition of compost worms—than the new invention to be described later, which produces good quality compost that can be successfully used in the garden after a period of only 6 to 8 weeks decomposition with good ventilation.

Furthermore, when using conventional composters, a dryer state can only be achieved reasonable quickly if over a longer period of time no further organic material is added to the top of the heap, which hardly seems practical given the amount of biological refuse continually produced by an average household. The reason for this is that organic waste consists of 70% water. This water tends to seep down into the container and so keeps the compost underneath wet.

It was therefore necessary to take up the challenge which was not only to produce dry and crumbly compost in the storage chamber, but to obtain compost in the shortest possible period after about 6-8 weeks rotting time when the material is not yet dry and crumbly by means of a device in the storage chamber and at the same time avoid the bridge effect described previously. Moreover, the apparatus should neither involve turning over the compost heap nor require any physical movement of the device by the user, as is necessary in other technological solutions such as those presented above. Apart from this, it should be relatively cheap to produce which seems especially important for those people wishing to make their own compost.

SUMMARY OF THE INVENTION

These demands have been met with an inventive new approach to composting. This involves the pile sliding slowly downwards around pipes, spheres cones or sloping panels fitted tightly against the container walls. This method avoids the problem of bridge formation on the grille. Even with moist and sticky compost.

The slide composters are inexpensive to manufacture and the production costs are no more than about 20% more than for the usual plastic home composting bins found on the market.

If the quantity of raw organic material processed within a given period and not the volume of a composting apparatus is taken as a comparison, this new innovative compost maker is actually considerably cheaper than conventional ones, because despite the 20% higher production costs, its composting performance is three times greater than that of an ordinary compost device. A 300 liter container equipped with this inventive apparatus produces 2,400 liters compared to 750 liters of compost produced when using a similar sized conventional composter. (See: http://www.bayern.de/lfu/um-wberat/data/praxs/kompost1_1999.htm)

This almost unbelievable difference is due to the fact that the oxygen-loving micro-organisms can only work to their full potential under optimal ventilation conditions. This is provided by the inventive vertical aeration throughout the entire cross-section of the compost heap which is not the case with conventional composter available on the market.

BRIEF DESCRIPTION OF THE DRAWINGS

The following is a description of the new invention with various modifications and the composting process and which refers to the outline sketches shown on page 8 of this document:

FIG. 1a illustrates various possible compost container forms.

FIG. 1b shows further octagonal and elliptical shapes.

FIG. 1c depicts a container with outwardly sloped sides.

FIG. 2a shows a conical container with a reaction chamber (1), storage chamber (2), harvest opening (11), slide vanes (4) of various sizes set at various angles (10), adjustment screws (3), and the container side (9).

FIG. 2b depicts another perspective of the compost container showing the slide vanes (4) without the adjustment screws (3).

FIG. 3 concerns diagrams of various slide gadgets. FIG. 3a shows a rectangular slide vane (4), FIG. 3b a pipe (5), FIG. 3c a half-pipe (8), FIG. 3d a cone (6), and 3e a sphere (7).

FIG. 4 shows diagrams of a rectangular shaped container with built-in braking accessories. FIG. 4a shows a container with slide panels, FIG. 4b with a pipe (5) or a half-pipe (8), FIG. 4c with a cone (6) and FIG. 4d with a sphere (7).

FIG. 5 shows a modular big container which can be enlarged to form a (small) compost installation.

DESCRIPTION OF THE PREFERRED EMBODIMENT

Organic material is put into the container from above (1), reaches, under aerobic conditions, the storage chamber (2) from the reaction chamber (1) only through the force of gravity over the slide vanes which slows down the flow of material which later can be easily removed with a shovel or the like from the harvest opening (11) from the storage chamber (2) without the whole heap weighing heavily on the shovel.

When filling the container for the first time, the material put in from above does not remain lying on the slide devices (FIGS. 2-4) but falls to the floor unless some sort of support is put into the container such as one or more strong vegetable cardboard boxes up to the height of the slide vanes, in which case the heap lies on the box or boxes. If sufficient material is used, after a short time a base layer develops due to the rotting process, which will lie on the slide vanes without the aid of the thoroughly wet boxes which can then be removed.

During the first phase of the composting process, biogenic waste items interact with each other due to juices freely released into the pile, and out of a loose pile of organic material, a coherent compost mixture emerges which can serve as a base layer suitable for innovative composting after a certain minimum thickness of about 20 cm over the slide panels has been attained.

Instead of using cardboard boxes on the first filling of the composter, there are of course other solutions such as filling the storage chamber with chopped wood. This has the advantage of affording good ventilation from below and at the same time the seeping water from the pile above is absorbed by the wood.

Without using support for the initial compost when using this composter, the pile would only partially rest on the slide device, (2-4) and would for the most part lie on the floor as when using conventional composters, but the material is looser=with better aeration because of the part support on the device (FIGS. 2-4).

On removing the material from the storage chamber (2) the load from the floor up is taken up by the support device (FIG. 2-4) and the new base layer situated above.

The pile can now in accordance with the aims of the invention slide down from the reaction chamber (1) to the storage chamber (2) through gravity alone over the sliding device (FIG. 2-4).

Ready compost can be removed comfortably from the storage chamber (2) from the harvest opening (11) with a shovel or the like without the whole weight of heap bearing down on the shovel and without the necessity of arduously turning over the pile. At the same time the entire pile is thoroughly vertically ventilated.

The form and the dimensions of small and large containers (FIGS. 1 and 5) could vary widely, so that in cooperation with the slide device the pile can slide slowly downwards from the reactor (1) to the storage chamber (2) and to the floor (FIG. 2).

As a sliding device everything suitable causing a braking action in combination with the parameters responsible for the sliding function either individually or in combination with each other is provided, as shown in FIGS. 1-4.

These are:

The shape of the composter (FIGS. 1a to 1c)

The dimensions of the composter

The texture of the wall surface structure which could be rough, smooth, grooved, pimpled etc.

Steps as long as they do not serve to act as hindrance to the sliding action of the compost material leading to the bridging effect, which means they should be somewhat sloped downwards, as is the case for waves and so on in the walls (9)

Slide vanes (4) are also adjusted by adjustment screws (3) to change their angles (10)—the smaller the angle the slower the sliding speed and vice versa A pipe (5) or a half-pipe (8) which should be placed some distance from the container walls (9), so that it does not act as a support or hindrance leading to bridge formation causing the pile to come to a standstill The slide vanes (4) are built directly on the container walls and slope at an angle (10) downwards, so that the panels do not hinder the sliding action which would otherwise cause bridge formation.

Sliding devices like a pipe (5) for example with a partly stronger braking surface to allow one to regulate the sliding speed, if it is chosen to turn their surfaces towards the compost. The pipe, (5) or half-pipe (8), for example, can be accordingly turned when deemed necessary. The half-pipe (8) can be set using the flat or the round part depending on the user's desired braking effect. The pipe (5) and half-pipe (8) could also be pimpled or be wave-like and so slow down the movement of the compost.

The dimensions and the exact shape of this apparatus can be determined by an expert. The following are concrete examples taken from tests carried out using containers and their devices.

Example FIG. 2 conical composter made out of PP, volume 300 liters, which has the following dimensions: the inner container floor at the bottom: 430×470 mm, top: 600×640 mm, height: 1150 mm, each slide vane (4): 300×50 mm (l×w) fitted on the two side walls (9) left and right of the harvest opening (11) and sloping downwards in the angle area (10) and can be adjusted from 110° up to 170° by the adjustment screws. 110° causes movement to come to a standstill while 170° causes the pile to move at the fastest rate.

The wrong angle choice made by a user can be easily prevented by putting a label on the marketable product giving advice concerning the correct angle adjustment.

In tests on different container shapes (FIG. 1), it came to light that containers that were conical in shape are more advantageous for home composters. For instance the adjustment screws (3) for the slide vanes (4) are easier to move because part of pile's weight rests on the container walls (9) and the slide vanes (4) have only to bear the remainder of the load by adjusting the angle (10) as shown in FIG. 2 with the adjustment screws (3). Furthermore it is easier to remove ripe compost from the storage chamber at a depth of 470 mm than larger deeper containers such as conventional ones which frequently use depths of 600 to 800 mm.

The adjustment screws (3) can be altered by the user when necessary or left at a medium setting.

Another example is a rectangular polypropylene container having a volume of 300 liters with dimensions of 540×570 mm and a height of 1000 mm, equipped with slide vanes (4) of 450×60 mm (l×w) fitted on both inner side walls (9) sloping downwards from the wall (9) in the angle area (10) from 140° at a height of about 270 mm, crossways at an angle of 90° over the vanes is a PVC pipe (5) strengthened on the inside which has a diameter of 40 mm and is installed over the entire width of the container.

A half-pipe (8) or a pipe (5) with partly stronger working braking surfaces such as rough, grooved, or pimpled ones can also be fitted depending on the sliding speed required. The sliding devices (FIG. 2-4) need not necessarily be fixed at one level but could also be installed at different levels.

The parameters responsible for the sliding velocity are:

The shape and dimensions of the composter

The shape and dimensions of the sliding device

The surface of the sliding device (rough, smooth, waved, pimpled, grooved)

The angle (10) of the adjustable slide vanes (4) on the walls (steep, flat, medium)

The height and weight of the pile (the height of the organic refuse from the kitchen should be at least 20 cm over the device and not more than 250 cm thick on account of vertical ventilation The moisture content of the pile (the dryer the material the slower it slides)

Some of these parameters can be adjusted by the users themselves such as the angles (10) by turning the adjustment screw(s) (3), pipe (5) with pimples and the like, or half-pipe (8), changing the moisture content by watering and altering the height of the pile.

This system can hardly break down:

If the container (FIG. 1) is not refilled from above (for instance during the user's holiday) the heap loses weight so long material is sliding down in the storage chamber (2) without compensation of fresh material, which means lower gravity for the sliding movement, which later on comes to an standstill. This is supported by drying of the material by vertical-aeration without being compensated for by fresh material. To sum up: the less weight, the less sliding.

The invention claimed is:

1. A biogenic matter composting system for producing high-quality compost without turning over the organic material, said biogenic matter composting system comprising:

a container having a reaction chamber and a storage chamber, and defining an opened top and a harvest opening in communication with said storage chamber, said storage chamber being located below and in communication with said reaction chamber, said container being adapted to receive organic material through said open top and transfer said organic material from said reaction chamber to said storage chamber via gravity with the introduction of air into the interior of said container; and at least one sliding device positioned between said reaction chamber and said storage chamber, said sliding device being oriented so as to project into the interior of said container a distance of about ⅓ the width of the container at said sliding device and at a downward angle from 110° to 170°;

wherein said sliding device being adapted to slow down the speed at which said organic material travels from said reaction chamber to said storage chamber.

2. The biogenic matter composting system according to claim 1, wherein the angle of said sliding device is adjustable, thereby adjusting the speed of said organic material traveling down into said storage chamber.

3. The biogenic matter composting system according to claim 2 further comprising at least one adjustment screw positioned through said container and attachable to said sliding device for adjusting the angle of said sliding device.

4. The biogenic matter composting system according to claim 3, wherein said sliding device has a surface adapted to decrease the sliding speed of said organic material by being provided with a braking surface selected from the group consisting of wavelike depressions, grooves, and pimples.

5. The biogenic matter composting system according to claim 3, wherein said reaction chamber has a container wall containing said sliding device, and wherein said sliding device has a conical shape.

6. The biogenic matter composting system according to claim 3, wherein said sliding device has a shape selected from the group consisting of a vane, a pipe, a half-pipe, a cone, and a sphere.

7. The biogenic matter composting system according to claim 3, wherein said sliding device is a pipe with different organic material braking properties located across the circumference thereof, said pipe being rotatable.

8. The biogenic matter composting system according to claim 3, wherein said sliding device is a plurality of sliding vanes arranged at the same level or at various levels.

9. The biogenic matter composting system according to claim 1, wherein said container is configured to include a plurality of steps protruding toward the interior of said container for decreasing the travel speed of said organic material.

10. The biogenic matter composting system according to claim 1, wherein said sliding device is two sliding vanes positioned in the interior of said container opposite of each other and adjacent said harvest opening.

11. A biogenic matter composting system comprising:

a container having a reaction chamber and a storage chamber, and defining an opened top and a harvest opening in communication with said storage chamber, said storage chamber being located below and in communication with said reaction chamber, said container being adapted to receive organic material through said open top and transfer said organic material from said reaction chamber to said storage chamber via gravity with the introduction of air into the interior of said container;

at least two sliding devices pivotably attachable to said container and positioned between said reaction chamber and said storage chamber opposite each other and adjacent said harvest opening, said sliding devices being oriented so as to project into the interior of said container a distance of about ⅓ the width of the container at said sliding devices and at a downward angle from 110° to 170°; and at least two adjustment screws passing through said container, one of said adjustment screws being adjacent and attachable to one of said sliding devices, and the other said adjustment screw being adjacent and attachable to the other said sliding device, said adjustment screws being adapted to adjust the angle of said sliding devices respectively;

wherein said sliding devices being adapted to slow down the speed at which said organic material travels from said reaction chamber to said storage chamber.

12. The biogenic matter composting system according to claim 11, wherein each of said sliding devices has a surface adapted to decrease the sliding speed of said organic material by being provided with a braking surface selected from the group consisting of wavelike depressions, grooves, and pimples.

13. The biogenic matter composting system according to claim 11, wherein said reaction chamber has a container wall containing said sliding devices, and wherein said sliding devices have a conical shape.

14. The biogenic matter composting system according to claim 11, wherein each of said sliding devices has a shape selected from the group consisting of a vane, a pipe, a half-pipe, a cone, and a sphere.

15. The biogenic matter composting system according to claim 11, wherein each of said sliding devices is a pipe with different organic material braking properties located across the circumference thereof, said pipe being rotatable.

16. The biogenic matter composting system according to claim 11, wherein said sliding devices are a plurality of sliding vanes arranged at the same level or at various levels.

17. The biogenic matter composting system according to claim 11, wherein said container is configured to include a plurality of steps protruding toward the interior of said container for decreasing the travel speed of said organic material.

18. A biogenic matter composting system comprising:

a container having a reaction chamber and a storage chamber, and defining an opened top and a harvest opening in communication with said storage chamber, said storage chamber being located below and in communication with said reaction chamber, said container being adapted to receive organic material through said open top and transfer said organic material from said reaction chamber to said storage chamber via gravity with the introduction of air into the interior of said container;

at least two sliding devices pivotably attachable to said container and positioned between said reaction chamber and said storage chamber opposite each other and adjacent said harvest opening, said sliding device being oriented so as to project into the interior of said container a distance of about ⅓ the width of the container at said sliding device and at a downward angle from 110° to 170°; and at least two adjustment screws passing through said container, one of said adjustment screws being adjacent and attachable to one of said sliding devices, and the other said adjustment screw being adjacent and attachable to the other said sliding device, said adjustment screws being adapted to adjust the angle of said sliding devices respectively;

wherein said sliding devices being adapted to slow down the speed at which said organic material travels from said reaction chamber to said storage chamber;

wherein each of said sliding devices has a surface adapted to decrease the sliding speed of said organic material by being provided with a braking surface selected from the group consisting of wavelike depressions, grooves, and pimples.

19. The biogenic matter composting system according to claim 18, wherein each of said sliding devices has a shape selected from the group consisting of a vane, a pipe, a half-pipe, a cone, and a sphere.

20. The biogenic matter composting system according to claim 18, wherein each of said sliding devices is a pipe with different organic material braking properties located across the circumference thereof, said pipe being rotatable.

* * * * *